DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 21, 1972

904 O.G. 274

T904,020
RAZOR BLADE COATING
George C. Lane, Danbury, Conn., assignor to Warner-Lambert Company, Morris Plains, N.J.
Filed May 18, 1971, Ser. No. 144,506
**Int. Cl. C23c *15/00***
U.S. Cl. 204—192
1 Sheet Drawing. 18 Pages Specification

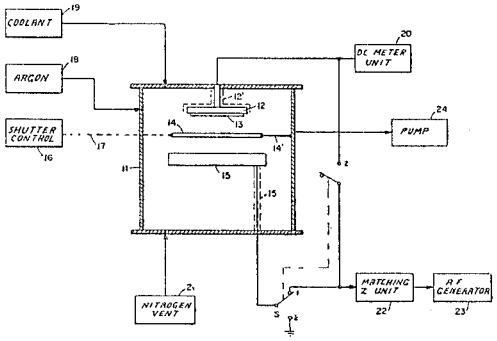

The specification is directed to pseudomorphologically depositing a material on the cutting edge of a razor blade. A specific embodiment provides for sputtering chromium on the blade edge and thereafter sputtering boron nitride on the chromium coating. The sputtered boron nitride pseudomorphologically replicates the body centered cubic form of the chromium on the blade edge.

Nov. 21, 1972 G. C. LANE T904,020
RAZOR BLADE COATING
Filed May 18, 1971
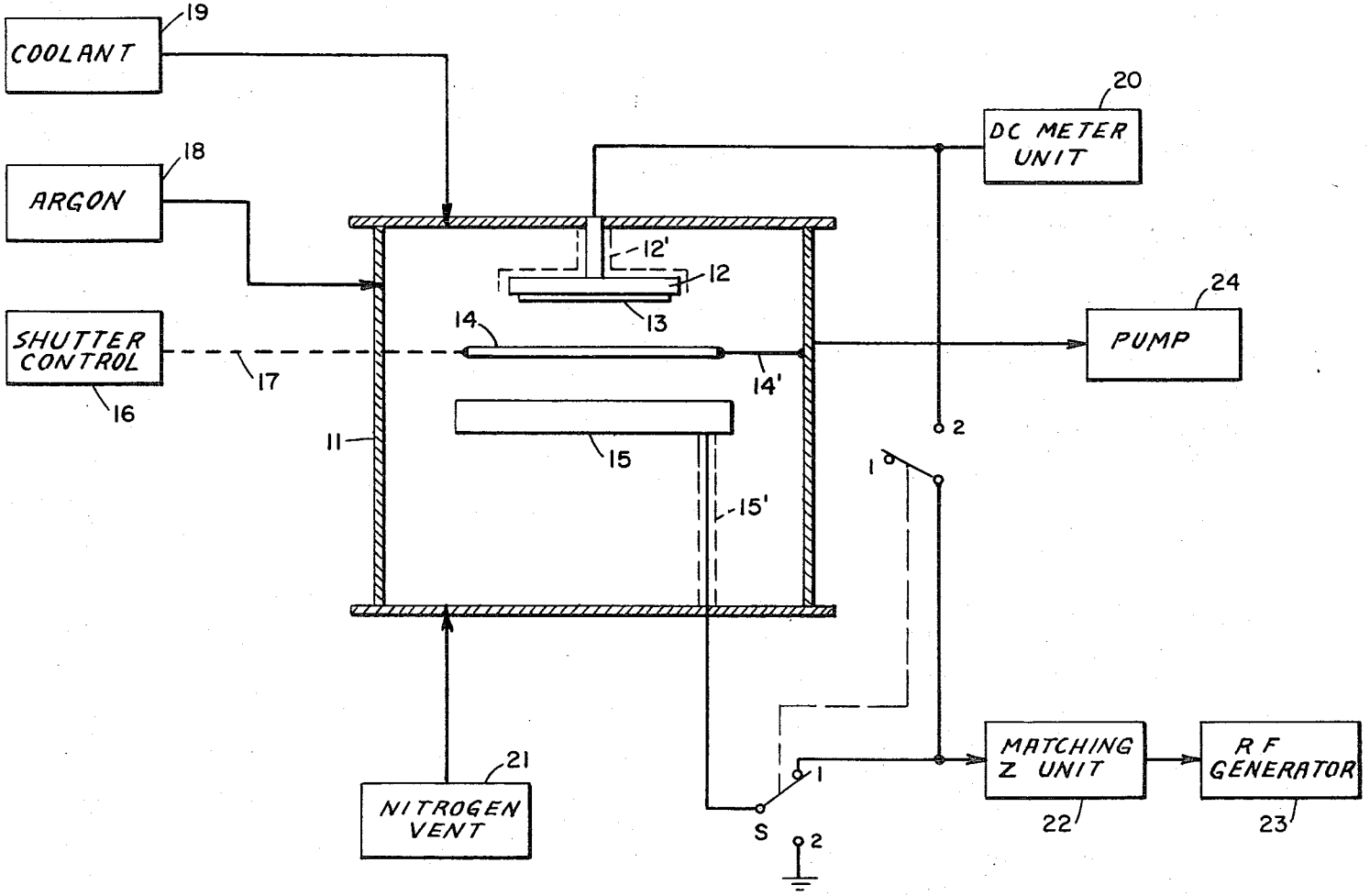
INVENTOR
George C. Lane
BY
ATTORNEY.